(No Model.)
I. OSGOOD.
SCHOOL DESK.
No. 346,860. Patented Aug. 3, 1886.
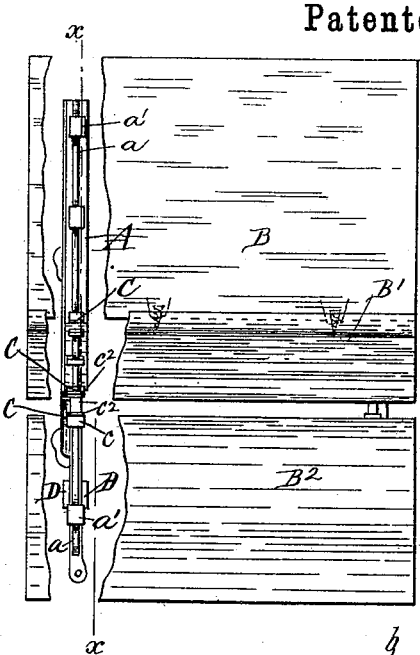
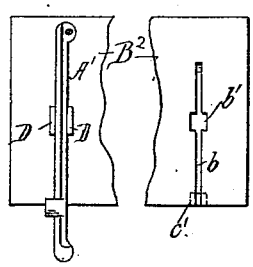
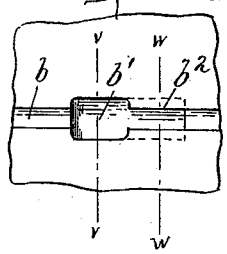
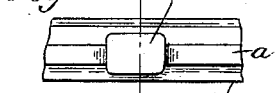
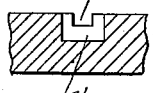
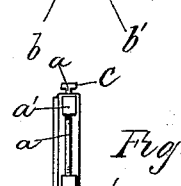
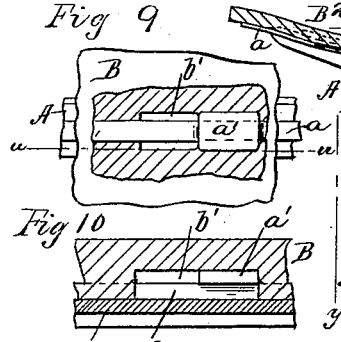
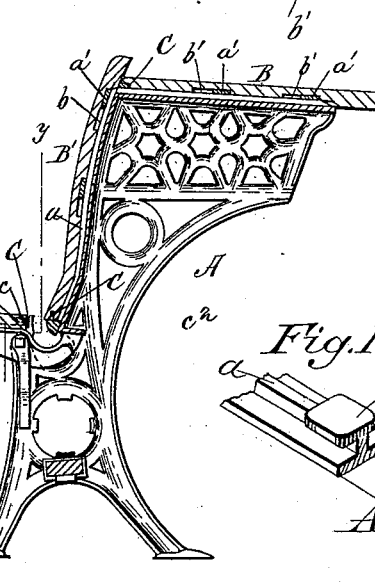
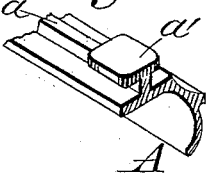
Witnesses
N. C. Coates
G. E. Faulkner.
Inventor
Isaac Osgood
By Coburn & Thacher
Attorneys
N. PETERS, Photo-Lithographer, Washington, D. C.

UNITED STATES PATENT OFFICE.

ISAAC OSGOOD, OF CHICAGO, ILLINOIS.

SCHOOL-DESK.

SPECIFICATION forming part of Letters Patent No. 346,860, dated August 3, 1886.

Application filed January 29, 1885. Serial No. 154,375. (No model.)

*To all whom it may concern:*

Be it known that I, ISAAC OSGOOD, a citizen of the United States, residing at Chicago, in the county of Cook and State of Illinois, have invented certain new and useful Improvements in School-Desks, which are fully set forth in the following specification, reference being had to the accompanying drawings, in which—

Figure 1 is a plan view of a combined school-desk and seat embodying my invention; Fig. 2, a sectional view of the same on the line $x\ x$ of Fig. 1; Fig. 3, a sectional view on the line $y\ y$ of Fig. 2, the boarding being removed; Fig. 4, a detail view of one of the retaining lugs or buttons; Fig. 5, a sectional view of the same on the line $z\ z$ of Fig. 4; Fig. 6, a detail view of the socket in the boarding which receives the retaining-lug; Fig. 7, a sectional view of the same on the line $v\ v$ of Fig. 6; Fig. 8, a sectional view of the same on the line $w\ w$ of Fig. 6; Fig. 9, a detail view showing the retaining-lug in position in its socket, a portion of the boarding being broken away to show the construction. Fig. 10 is a sectional view of the same on the line $u\ u$ of Fig. 9, and Fig. 11 is a bottom plan view of the seat with one bracket-arm attached and the other removed. Fig. 12 is a detail view of the rib, a lug, and the shield-plates. Figs. 1, 2, 3, and 11 are drawn on the same scale, the remaining figures being drawn on a larger scale.

Like letters refer to like parts in all the figures.

My invention relates to combined school desks and seats; and it consists in certain means for readily and firmly attaching the seat-back and desk portions to the standards or frames in such manner that the connection between the parts is concealed and does not mar the appearance of the outer surface of the same; and to these ends it consists in certain novel features which I will now proceed to describe, and then specifically point out in the claim.

In the drawings, A represents the standards or supports to which the various portions of the desk and seat are attached, each standard being provided with a swinging bracket-arm, A', to which the seat is attached, the said bracket-arms being provided with the usual stops to hold the seat in position when it is swung down, as shown in the drawings. Upon the upper edge of each standard and upon the front face thereof, and also upon the upper side of the bracket-arms, is formed a projecting rib, $a$. In the drawings this rib is shown as being in a separate piece from the standards and bracket-arms, and attached thereto by riveting or otherwise; but it may be made in one piece with the standards and arms, if deemed preferable. In any event, however, the rib will be so fastened to the standards and bracket-arms as to form practically a portion of the same. A corresponding groove, $b$, is formed in the under side of the desk-top B of the back B' and of the seat B², to receive the rib $a$. At suitable points upon these ribs $a$, I form lugs or buttons $a'$, shaped substantially as shown in Figs. 4 and 5 of the drawings, the said lugs projecting above the top of the rib, and also overhanging it on each side, as clearly shown in Fig. 5. At corresponding points of the groove $b$ in the pieces B B' B², I form seats or sockets $b'$, to receive the said lugs $a'$, each socket being of about twice the length of the lug $a'$ and of a depth exceeding the depth of the groove $b'$ by as much as the lug $a'$ exceeds the height of the rib $a$. Along the longer edges of the socket $b'$, and extending about one-half the length thereof, are arranged flanges $b^2$, as shown in Figs. 6 and 8 of the drawings, the said flanges being of such a thickness as to leave between them and the bottom of the socket $b'$ a sufficient space to receive the projecting side portions of the lug $a'$, so that when the said lug is inserted in the unflanged portion of the socket $b'$ and the piece in which the socket is formed is moved longitudinally, so as to cause the projecting side portions of the lug $a'$ to pass under the flanges $b^2$, the two parts will be firmly locked together, as shown in Figs. 9 and 10 of the drawings.

At the end of each rib $a$, or, more properly speaking, at the end of each section of the said rib, is formed a stop, C, consisting of a transverse plate, $c$, arranged on top of the rib $a$, and entering a recess, $c'$, formed in the edge of the part which is attached to that particular section of the rib $a$. A plate, $c^2$, arranged in a plane at right angles to the plate $c$, may be used as an abutment for the end of the adjacent piece B' or B², as the case may be, this plate also serving as a means for covering up and concealing the recess $c'$ when the seat or back is in position. The stops which are at the end of the rib $a$, on the upper edge of the standards A, are not provided with this plate $c^2$, since the projecting end of the back B' fulfills its functions in this case, as clearly shown in Fig. 2 of the drawings.

From the above construction it will be readily seen that by placing any one of the parts B B' B² so that the unflanged portion of the sockets $b'$ coincides with the lugs $a'$, the piece in question may be forced down until it rests upon the standard or bracket arm, with the rib $a$ in the groove $b$, and that by moving the said piece in the direction of the rib and groove the projection $a'$ will pass over the flanges $b^2$, as shown in Fig. 10 of the drawings, so that any separation of the parts will be impossible without returning the pieces to their original position. It will be seen that the edge of the bracket A is of sufficient breadth to cover and conceal the unflanged portion of the socket $b'$ which is exposed by moving the parts into their locked position, as above described; but the upper edge of the bracket-arm $a'$ is not sufficiently broad for this purpose, and in order to obviate this difficulty and conceal the recess $b'$, so as to hide the connection between the two parts when the seat is raised, I form upon the upper edge of the bracket-arm, in a position slightly in the rear of the lug $a'$, a shield-plate, D, of sufficient size to completely cover and conceal the unflanged portion of the socket $b'$, as shown in Figs. 2 and 11 of the drawings. In case the edges of the standard A are not of sufficient width to effect this purpose, similar plates, D, may be attached thereto at the proper points.

By means of a single screw passing up through each bracket-arm into the seat B², and screws through the upper portion of the back B' into the edge of the top B, at the junction of the two, these several parts may be readily and firmly secured in position without any of the connecting devices which secure them to the frame being apparent.

I do not wish to be understood as limiting myself strictly to the precise details of construction hereinbefore set forth and shown in the drawings, for it is obvious that many mechanical modifications in the same may be made without departing from the principle of my invention. For instance, the rib $a$ may be dispensed with, and the button $a'$ may rise directly from the standard or bracket-arm; but I deem the employment of the rib preferable, as it makes a more perfect joint and entirely prevents any lateral displacement. The stop C may also be dispensed with, since the lugs $a'$ will act as stops themselves by coming in contact with the end of the socket $b'$. Moreover, although I have shown two lugs, $a'$, employed on each standard for securing the top, B, and the same number for securing the back, B', while but a single lug on each arm A is shown for securing the seat, I do not limit myself to this number of lugs for each part, as it may be varied to suit the size of the desk, the strength of the material, and other conditions. It is also obvious that, although I have shown and described my invention as applied to a combined school-desk and seat, it is equally applicable to either separately or to other structures of the same general nature.

I am aware of Letters Patent No. 23,542, granted to Frederick S. Barnard, April 12, 1859, which show a tongued and grooved sectional dovetail, the laterally-projecting portions of the tongue and the correspondingly-inclined portions of the groove being cut away at intervals to permit the parts to be readily interlocked. This construction, while it is well adapted for the purpose of connecting the edges of boards, is not adapted to my purpose, since, if the tongue is of sufficient height to give the laterally-projecting portions thereof a sufficient hold, the groove in the desk, top, back, or seat must be cut almost through the said portions and so weaken them as to render the connection practically useless. The rib in my construction is merely of a sufficient height to prevent any lateral strain from breaking the lugs off, and is not high enough to necessitate such a groove as would in any way weaken the parts.

I am also aware of Letters Patent No. 191,713, granted to Charles H. Presbrey, June 5, 1877, which show a blind nut sunk into the top of a school-desk in a dovetailed groove, an enlarged recess being formed at the end of the groove to permit the insertion of the nut. In this construction the nut is first inserted in the desk-top, which is then laid upon supporting-standards, and screw-bolts are then passed through the standard-top and screwed into the nuts. If, however, the nuts were secured upon the upper side of the standard by means of the screw-bolts before the top were applied, the construction would still be different from the one I employ, since the nuts, which in this case correspond with the lugs of my construction, are not permanently or rigidly attached to the standards and will readily work loose, while at the same time the additional cost of the screw-bolts and of the screw-threading of the nuts, and also the increased time necessary to assemble the parts, render my construction more advantageous in these respects.

Having thus described my invention, what I claim as new, and desire to secure by Letters Patent, is—

The combination, with the bracket-arms provided with undercut lugs, of the desk-seat having undercut sockets, as described, to receive the said lugs, and shield-plates arranged on the bracket-arm to cover the unflanged portions of the sockets when the parts are in position, substantially as and for the purposes specified.

ISAAC OSGOOD.

Witnesses:
W. C. CORLIES,
IRVINE MILLER.